April 6, 1965  R. D. ANWYL  3,176,599
FILTER COMPENSATION DEVICE
Filed April 29, 1963  2 Sheets-Sheet 1
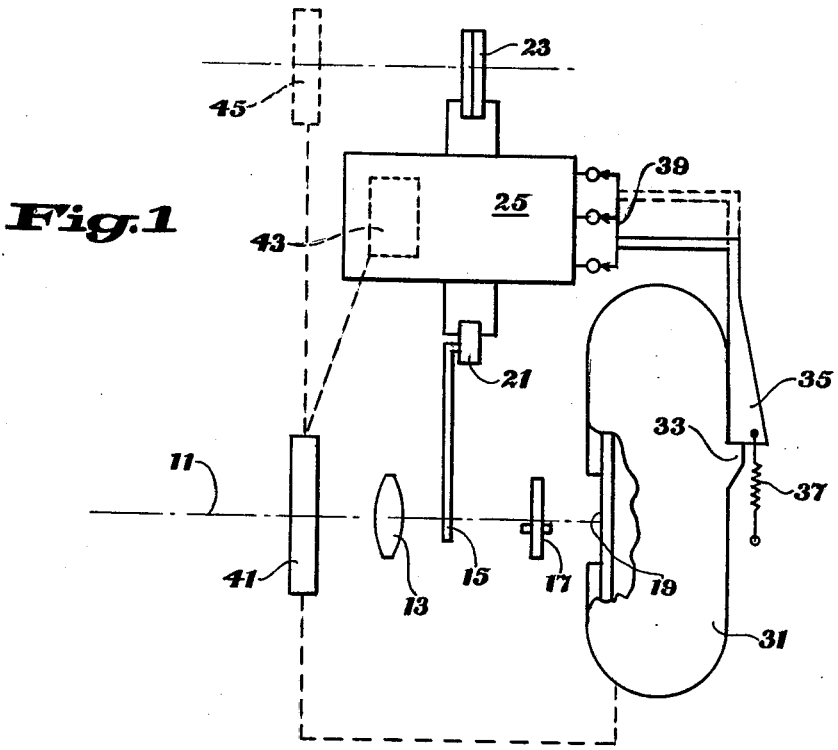
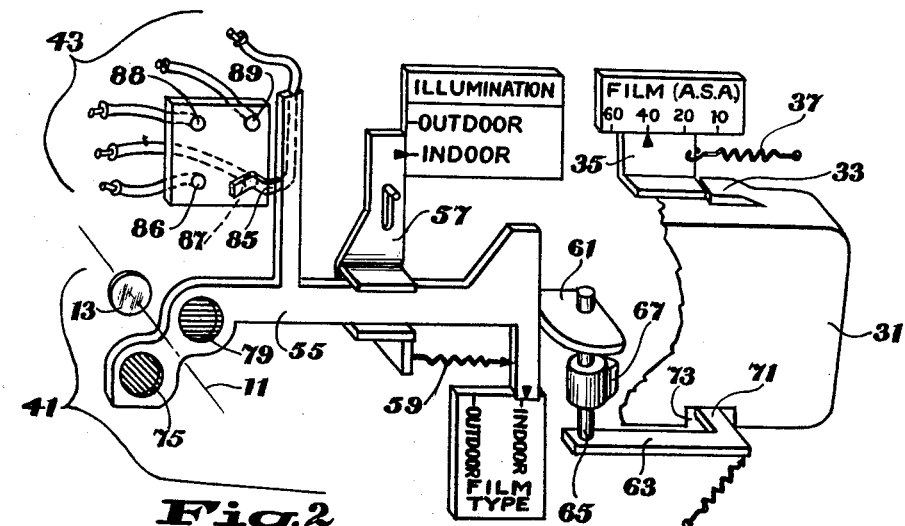
Robert D. Anwyl
INVENTOR.
BY
ATTORNEYS

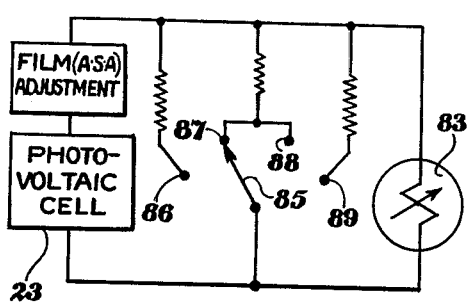
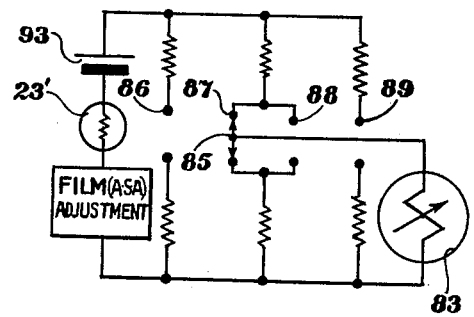
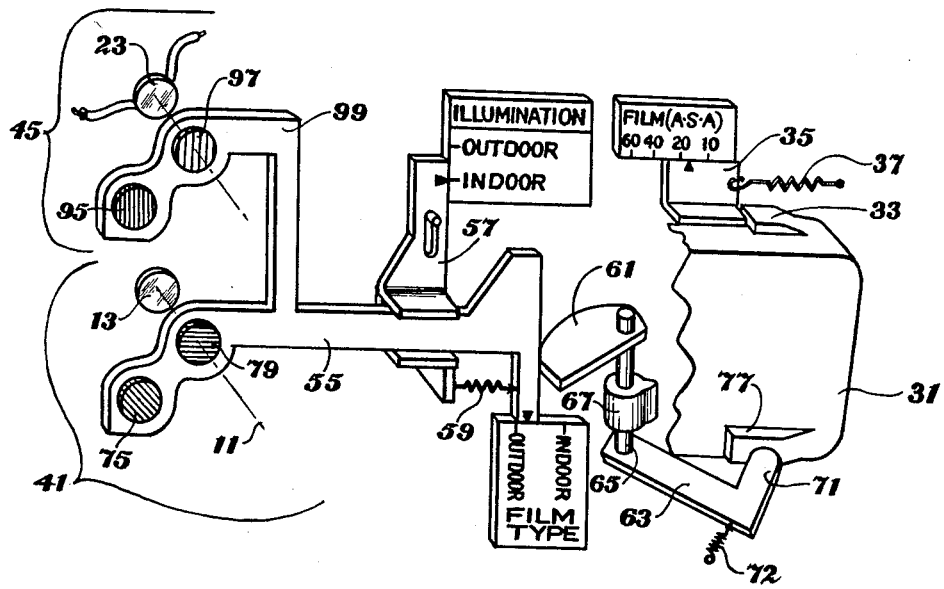

United States Patent Office 3,176,599
Patented Apr. 6, 1965

3,176,599
FILTER COMPENSATION DEVICE
Robert D. Anwyl, Rochester, N.Y., assignor to Eastman Kodak Company, Rochester, N.Y., a corporation of New Jersey
Filed Apr. 29, 1963, Ser. No. 276,412
14 Claims. (Cl. 95—10)

This invention relates to cameras utilizing photo-responsive means for exposure control purposes and, more particularly, to filter control devices for automatically correlating the spectral composition of light passing through a camera's lens system with the spectral sensitivity of the film in the camera as well as compensating the photo-responsive means of the camera to adjust for the light loss occasioned by the use of any color-balancing filters.

It has been common practice for many years to align filters with a camera's lens system to correlate the spectral composition of light entering the camera with the spectral sensitivity of the film being exposed, e.g., a special filter is used to assure proper color balance when indoor-type film (having special sensitivity to tungsten light) is used to photograph a scene illuminated by daylight. In some prior art devices, manual operation of a lever or slide positions the proper type of color compensating filter into or out of alignment with the camera's picture-taking lens.

Similarly, many well-known photo-responsive devices have been included in prior art cameras to provide the camera operator with exposure control information, or to semi-automatically or automatically control the exposure of cameras. Most of these devices utilize the varying output of a photocell circuit to operate a relay or galvanometer coil which in turn controls the size of the camera's aperture and/or shutter speed as a function of scene brightness. In movie cameras, these automatic devices are generally calibrated in accordance with various film speeds, slower speed (less sensitive) films requiring more light to photograph a given scene than that required by higher speed films.

Whenever filters, such as those described above, are employed with cameras having photo-responsive exposure control devices, it is necessary for the camera operator to adjust the photo-responsive device to compensate for the loss of light absorbed by the filter. Initially, the camera operator had to either (1) remember to reset the camera for a second "filter" film speed for the particular film being used, or (2) to interpolate a "filter factor" by which the film speed setting of the photo-responsive exposure control device had to be reduced. More recently, filter adjusting systems such as that disclosed in U.S. Patent No. 2,975,693 (issued to C. Ort on March 21, 1961) have made this adjustment of the camera's photo-responsive means simpler for the operator by encoding filters with information that can be sensed by the camera's photo-responsive means to provide automatically the necessary adjustment whenever a filter is inserted by the operator.

The invention herein is an improvement over systems such as that disclosed in the Ort patent and further simplifies picture-taking by removing the need for any determination by the operator as to whether or not a color-balancing filter may be necessary and, if so, as to the type required.

According to the invention herein, the camera operator merely sets a dial in accordance with the scene illumination (e.g., "daylight" or "tungsten") and the spectral composition of light passing through the camera's lens is correlated automatically with the spectral sensitivity of the film in the camera. This is accomplished by the automatic positioning of selected filters and, concurrently, the adjustment of the camera's photo-responsive means to compensate for the light loss occasioned by the introduction of the required filter.

The embodiments of the invention disclosed herein provide simple and "fool-proof" automatic filter adjustment systems wherein the operator is no longer required to remember even the spectral sensitivity characteristics of the film (i.e., "daylight" or "Type A"). All that is necessary is that the operator set a dial to "outdoors" or "indoors" (or, "daylight" or "tungsten"), and the camera and its photo-responsive means are automatically conditioned to provide proper color balance and exposure. While it has been known in the art to utilize information structurally encoded on a film magazine to condition photo-responsive systems according to over-all film sensitivity (see, for instance, U.S. Patents 2,080,055 and 2,186,611 issued to L. R. Martin on May 11, 1937 and January 9, 1940, respectively) the invention herein utilizes additional magazine encoding to indicate the spectral characteristics of the film (i.e., "daylight" or "tungsten" balance). This further information is sensed when the magazine is inserted into the camera and is used to initially position a filter plate to bring a suitable color-balancing filter into potential alignment with the camera lens. So long as the lighting condition indicated by the dial corresponds to the spectral sensitivity characteristics of the film, i.e., daylight balanced film "outdoors" or tungsten-balanced film "indoors," no filter is aligned with the lens. However, whenever "outdoors" is indicated on the dial and the magazine holds tungsten-balanced film, or vice versa, the filter plate is moved until the appropriate filter, which is initially selected according to the spectral sensitivity information encoded on the magazine, is aligned with the lens. Whenever a filter is so aligned, means responsive to the position of the filter plate concurrently compensate the photo-responsive system of the camera for the loss of filter-absorbed light by altering the masking of the photocell, or by altering the position of the galvanometer, or by varying the resistance in circuit with the photocell.

It is an object of this invention to provide a new and improved filtering mechanism for cameras.

Another object of the invention herein is to provide means whereby information representative of the spectral sensitivity characteristics of magazine-held film may be encoded on the magazine and sensed by the camera when the magazine is inserted into it, thereby conditioning the camera's exposure control system.

A further object is to provide simple means whereby the camera operator merely sets a dial to indicate the lighting conditions under which an exposure is being made and thereby the camera is automatically set so that the light entering the camera will be properly filtered to correlate with the spectral sensitivity characteristics of the film being exposed and so that the camera's photo-responsive exposure control system is properly compensated for the introduction of the filter, thereby assuring proper color balance and exposure of the film.

Other objects, purposes and characteristic features of the present invention will be in part obvious from the accompanying drawings and in part pointed out as the description of the invention progresses. In describing the invention in detail reference will be made to the accompanying drawings in which like reference characteristics designate corresponding parts in both views, and in which:

FIG. 1 schematically illustrates the essential elements of a simple movie camera incorporating the subject invention;

FIG. 2 is a schematic perspective of the pertinent parts of a preferred embodiment of the subject invention;

FIGS. 3 and 4 are two schematic diagrams of possible photo-responsive circuits that might be utilized in conjunction with the embodiment illustrated in FIG. 2; and FIG. 5 is a schematic perspective of a modified version of the embodiment shown in FIG. 3.

Although it will be apparent that the invention herein can be integrated with most semi-automatic and fully automatic exposure control systems and can be applied equally to all types of cameras and all types of film carrying spools, cartridges and cassettes, the following description of the invention will be limited to embodiments integrated with a simple, magazine-loading motion picture camera having a fully automatic exposure control system as illustrated schematically in FIG. 1. The camera has a picture-taking axis 11 on which are aligned a taking-lens system 13, a variable diaphragm vane 15, a shutter mechanism 17 and a photosensitive surface such as film strip 19. Diaphragm vane 15 is attached to and moves with the coil 21 of a galvanometer-type instrument energized by photocell 23 to which it is connected by means of electrical circuitry 25. Photocell 23 is illuminated by scene light and its exposure determines the output of circuit 25 and the position of coil 21 and vane 15, thereby controlling the exposure of film 19 as a function of scene brightness.

Since the exposure required for proper photographs varies with the sensitivity of the film being exposed, automatic exposure control systems must be adjustable for such changes in film sensitivity. It is assumed that the exposure control system in the camera illustrated in FIG. 1 is automatically set for the sensitivity of film 19 by means of information encoded on the outer surface of the film carrying means. In the form disclosed, the cover of film magazine 31 is provided with structural projection 33 which positions slide 35 against the bias of spring 37. While the positioning of slide 35 may be utilized in any number of ways known in the art to adjust the output of the camera's photo-responsive system (see, for instance, the above cited U.S. patents to L. R. Martin), it is assumed that slide 35 moves electric switch means 39 to alter the resistance in photo-responsive circuit 25.

A taking-lens filter system 41 is conditioned automatically by information encoded on film magazine 31, and either resistance switching means 43 or photocell masking means 45 are set automatically in response to the positioning of filter system 41 to vary the output of photo-responsive circuit 25 as a function of the light absorbed by filter system 41.

FIGS. 2-5 illustrate with more particularity embodiments of the invention schematically shown in FIG. 1. Referring now to FIG. 2, only those camera parts essential to an understanding of the invention herein are illustrated. The dotted line 11 represents the camera's picture-taking axis on which is mounted lens 13 (and also the camera's shutter 17 and the fully automatic variable diaphragm vane 15, as explained above and shown in FIG. 1).

Filter plate 55 is slidably mounted on input member 57 which is attached to the camera mounting plate for movement in a vertical direction only. Filter plate 55 is biased by compression spring 59 against cam 61. Cam 61 is rigidly mounted to bell crank 63 by means of axle 65, this entire cam unit being rotatably attached to the camera mounting plate by means of support 67.

Cam 61 is positioned in accordance with the spectral sensitivity characteristics of the film held in magazine 31. When magazine 31 is inserted into the camera, sensing toe 71 of bell crank 63 contacts a portion of the surface of magazine 31. The structural conformation of this surface portion, illustrated simply as either an indentation or a protrusion, has been preselected in accordance with the type of film ("indoor" or "outdoor") in the magazine. It can be seen in FIG. 2 that a complementary coding structure is provided on the magazine and camera, comprising sensing toe 71 contacting magazine 31 at indentation 73. In this instance indentation 73 indicates that magazine 31 is carrying film which has been balanced for use with tungsten illumination, and when magazine 31 is inserted into the camera, cam 61 takes the position shown. Compression spring 59 pushes filter plate 55 to the right, along a generally horizontal locus, against cam 61 and basically conditions filter system 41 for "indoor" film.

Input member 57 is positioned manually by the camera operator in accordance with the type of illumination conditions under which photographs are to be made. In the position illustrated in FIG. 2, input member 57 is set for "indoor" illumination, indicating that photographs are to be taken in a scene primarily illuminated by tungsten lamps. Therefore, "indoor" film is being used under the conditions for which it was balanced by the manufacturer, namely, tungsten illumination, and since no filter is required to achieve proper color balance, filter plate 55 is positioned out of alignment with lens 13.

However, in the event that the camera operator wishes to use "indoor" (Type A) film when photographing subjects in daylight, proper color balance in the resulting photographs will be obtained only in the event that the exposing light first passes through a daylight filter (Type 85). Filter 75 mounted on filter plate 55 is such a "daylight" filter. It can be seen that when the camera operator slides input member 57 upwardly to its proper position indicating "outdoor" (daylight) illumination condition, filter plate 55 is moved along a generally vertical locus to align filter 75 with picture-taking axis 11.

While the embodiments illustrated in FIGS. 2 and 5 differ in the manner in which they compensate the camera's photo-responsive means, as will be discussed in detail below, the basic positioning of the filter system is the same in both.

Referring now to FIG. 5 it is assumed that magazine 31 is carrying film having spectral sensitivity characteristics which have been balanced by the manufacturer for "daylight" illumination, and this is indicated on magazine 31 by means of structural protrusion 77. When magazine 31 is in the camera, sensing toe 71 is contacted by protrusion 77 and forced against the bias of compression spring 72 to the position shown. This rotates cam 61, which in turn, forces filter plate 55 to move to the left along its horizontal locus against the force of compression spring 59, conditioning filter system 41 for "outdoor" type film.

In the event the camera operator wishes to expose this "outdoor" film under conditions of tungsten illumination, input member 57 must be moved to the position illustrated in FIG. 5. Under these conditions, a "Type 80" filter 79 is introduced in front of picture-taking lens 13, thereby providing proper color balance. It can be seen that when pictures are to be taken in daylight, the camera operator merely moves input member 57 upwardly in a vertical direction to the "outdoor" position, thereby also raising filter plate 55 along its vertical locus and removing filter 79 from picture-taking axis 11.

Attention is called to the fact that, while the preferred embodiments illustrated disclose filter system 41 as being attached to the camera, the filter system could be directly mounted on the film-carrying magazine.

As was discussed above, whenever, a filter is introduced in front of a camera's picture-taking lens, a light loss is sustained due to the absorption or reflection of a percentage of the incident light by the filter. This, in effect, alters the brightness of the scene as "seen" by the film and therefore necessitates compensation of the camera's photo-responsive system, since the latter normally responds to the actual brightness of the scene being photographed.

Referring once again to FIG. 2, it is assumed that this embodiment is in a camera utilizing photo-responsive circuitry such as that represented in either FIGS. 3 or 4. In FIG. 3, photovoltaic cell 23 is connected to galvanometer 83 by an electrical network in which switch 85 selectively engages contacts 86, 87, 88, or 89 to vary the resistance paralleling meter 83. FIG. 4 merely shows a variation in which photoconductive cell 23' and battery 93 are connected to meter 83 through any one of a group of series-parallel resistance networks selected by switch 85 in cooperation with contacts 86, 87, 88 and 89.

Switch arm 85 is attached directly to and moves with filter plate 55. It can be seen that for each of the four possible positions to which filter plate 55 may be moved, switch arm 85 selectively contacts one of the electrical contacts 86, 87, 88 or 89, thereby selectively varying the resistance in the camera's photo-responsive circuit. In this manner, the camera's photo-responsive means is automatically compensated according to the characteristics of each filter introduced in front of the picture-taking lens.

It should be readily understood that means for providing the required compensation of the photo-responsive means could take forms other than that just described above. For instance, the compensation means could just as well be based upon a rotation of the meter movement, or an alteration in the starting position of the camera's automatically controlled diaphragm vane, or, as will be seen below, the masking of the photocell.

FIG. 5 merely illustrates a modification of the disclosed preferred embodiment of the invention wherein the compensation of the photo-responsive means is accomplished by masking photoconductive cell 23. According to this modification optically neutral filters 95 and 97 are mounted in appropriate apertures in extension 99 of filter plate 55 and are disposed for alignment respectively with photocell 23 whenever filters 75 and 79, respectively, are aligned with taking lens 13. Filters 95 and 97 are designed to absorb or reflect a predetermined percentage of the light passing to photocell 23 such that the output of the camera's photoresponsive means will vary linearly with the amount of light absorbed by filters 75 and 79. It should be noted, that filters 95 and 97 are not identical with filters 75 and 79, respectively, but rather are of a density that is empirically determined to provide the required linear correlation. This is necessary since the use of similar filters to mask both the taking lens and the photocell would not generally provide the desired linear correlation due to the difference in the spectral sensitivities of film and photocells.

It can be seen from the above description that the invention herein greatly simplifies the problem of color balance from the viewpoint of the operator. With cameras according to the invention herein, it is no longer necessary for the camera operator to be concerned with or to remember the film type (spectral sensitivity characteristics) of the film which is in his camera in order to assure proper color balance in the pictures he takes. All that is required of the operator is that he move a manual switch indicating the lighting conditions under which he is making photographs, and based upon this simple setting, the invention herein assures both proper color balance and proper exposure by the automatic induction of filters when necessary and the concurrent adjustment of the camera's photoresponsive exposure control system to compensate for the introduction of such filters.

It should be understood that the specific embodiments of the present invention described herein have been selected to facilitate the disclosure of the invention rather than to limit the particular form which the invention may assume and, further, that various modifications, adaptations, and alterations may be applied to the specific forms shown to meet various requirements of practice without in any manner departing from the spirit or the scope of the present invention.

I claim:

1. In a camera loaded by insertion of film carrying means and receiving scene light along a picture-taking axis for exposure of film, the combination comprising:

structural means on said film carrying means having a preselected conformation representative of the spectral sensitivity of film carried thereby;

a filter element movable into and out of alignment with said axis to alter the spectral composition of light exposing said film;

lighting condition input means positionable in accordance with the spectral characteristics of scene illumination; and filter control means cooperating with and responsive to the conformation of said structural means and to the position of said lighting condition input means, for moving said filter element into and out of alignment with said axis to correlate the spectral composition of light exposing said film with the spectral sensitivity of said film.

2. The combination according to claim 1 wherein said filter element includes a plurality of filters, said element being movable to any one of a plurality of positions for causing selected ones of said filters to be moved into alignment with said axis.

3. The combination according to claim 2 wherein said filter element comprises a filter plate having a plurality of apertures for holding said filters, said plate being movable along both a first locus and a second locus for causing selected ones of said filters to be moved into alignment with said axis; and wherein said structural means determines the position of said plate along said first locus and said lighting condition input means determines the position of said plate along said second locus.

4. In a camera and film carrying means adapted for insertion into said camera, said camera having (a) a picture-taking axis along which film-exposing light is received, (b) exposure control means including a movable element, and (c) photo-responsive means producing an output to control the position of said element as a function of scene brightness, the improvement comprising: a filter element movable into and out of alignment with said axis for altering the spectral composition of light exposing said film; structural means on said film carrying means having a preselected conformation representative of the spectral sensitivity of film carried thereby; lighting condition input means positionable in accordance with the spectral characteristics of scene illumination; filter control means cooperating with and responsive to said structural means on said film carrying means and to the position of said lighting condition input means for moving said filter element into and out of alignment with said axis to correlate the spectral composition of light exposing said film with the spectral sensitivity characteristics of said film; and compensation means responsive to the position of said filter element for altering the output of said photo-responsive means in accordance with the characteristics of said filter element when said element is aligned with said picture-taking axis.

5. The combination according to claim 4 wherein said filter element includes a plurality of filters, said element being movable to any one of a plurality of positions for causing selected ones of said filters to be moved into alignment with said axis, and wherein said compensation means alters the output of said photo-responsive means in accordance with the characteristics of each said filter when said filter is aligned with said picture-taking axis.

6. The combination according to claim 4 wherein the output of said photo-responsive means is electrical and positions said movable element through an electrical circuit; and wherein said compensation means comprises: electrical resistance means, and switch means responsive to the position of said filter element for connecting said resistance means into said electrical circuit to alter the output of said photo-responsive means.

7. The combination according to claim 4 wherein said photo-responsive means includes a photocell, and wherein said compensation means includes masking means for varying the exposure of said photocell in accordance with the position of said filter element to provide thereby the alteration of said photo-responsive means output.

8. In a camera loaded by insertion of film carrying means and receiving scene light along a picture-taking axis for exposure of film, said camera having exposure control means including a movable element and photo-responsive means producing an output to control the position of said element as a function of scene brightness, the improvement comprising: a plurality of filters; a filter plate having a plurality of apertures wherein said filters are mounted, said plate being movable along both a first locus and a second locus for causing selected ones of said filters to be moved into alignment with said axis to alter the spectral composition of light exposing said film; structural means on said film carrying means having a preselected conformation representative of the spectral sensitivity of film carried thereby; sensing means in said camera responsive to the conformation of said structural means on said film carrying means for determining the position of said filter plate along said first locus; a lighting condition input member positionable in accordance with the spectral characteristics of scene illumination; means connecting said input member and said filter plate for causing the position of said filter plate along said second locus to be determined by the position of said input member; and compensation means responsive to the position of said filter plate for altering the output of said photo-responsive means; whereby, when said film carrying means is in said camera and said input member is positioned according to scene illumination, the spectral composition of light exposing said film is correlated to the spectral sensitivity of said film, and the output of said photo-responsive means is altered in accordance with the characteristics of each said filter when said filter is aligned with said picture-taking axis.

9. Film carrying means for loading into a camera, said camera receiving scene light along a picture-taking axis for exposing film and having filter means positionable into and out of alignment with said axis for varying the spectral composition of film-exposing light, said film carrying means having structural means thereon of a predetermined conformation in accordance with the spectral sensitivity of said film, said structural means cooperating with said filter means when said film carrying means is in said camera to position said filter means to correlate the spectral composition of said film-exposing light with the spectral sensitivity of said film.

10. Film carrying means according to claim 9 and having an outer surface wherein said structural means comprises a raised portion thereof.

11. Film carrying means according to claim 9 and having an outer surface wherein said structural means comprises an indented portion thereof.

12. In a camera loaded by insertion of film carrying means having structural means thereon of a predetermined conformation in accordance with the spectral sensitivity of film carried thereby, said camera receiving scene light along a picture-taking axis for exposing film, the combination comprising: a filter element movable into and out of alignment with said axis to alter the spectral composition of film-exposing light; lighting condition input means positionable in accordance with the spectral characteristics of scene illumination; and filter control means responsive to said structural means when said film carrying means is in said camera and to the position of said lighting condition input means, for moving said filter element into and out of alignment with said picture-taking axis to correlate the spectral composition of film-exposing light with the spectral sensitivity of said film.

13. A camera according to claim 12 wherein said filter element comprises a plurality of filters and a filter plate having a plurality of apertures for holding said filters, said plate being movable along both a first locus and a second locus for causing selected ones of said filters to be moved into and out of alignment with said axis; and wherein said structural means determines the position of said plate along said first locus and said lighting condition input means determines the position of said plate along said second locus.

14. A camera according to claim 12 wherein said camera further comprises: exposure control means including a movable element; photo-responsive means producing an output to control the position of said element as a function of scene brightness; and compensation means responsive to the position of said filter element for altering the output of said photo-responsive means in accordance with the characteristics of said filter element when said element is aligned with said picture-taking axis.

References Cited by the Examiner

UNITED STATES PATENTS

| | | | |
|---|---|---|---|
| 2,080,055 | 5/37 | Martin | 95—10 X |
| 2,186,611 | 1/40 | Martin | 95—10 X |
| 2,320,722 | 6/43 | Frost | 95—10 X |
| 2,493,928 | 1/50 | Rath | 95—10 |
| 2,975,693 | 3/61 | Ort | 95—10 |
| 2,999,443 | 9/61 | Miyauchi | 95—10 |
| 3,025,777 | 3/62 | Wilkenson | 95—10 |

NORTON ANSHER, *Primary Examiner.*